(12) United States Patent
Kiefer et al.

(10) Patent No.: US 7,557,295 B2
(45) Date of Patent: Jul. 7, 2009

(54) ISOLATING TUBE FOR A COOLING ELEMENT WHICH CAN BE LOADED WITH HIGH VOLTAGE

(75) Inventors: Jochen Kiefer, Nussbaumen (CH);
Martin Lakner, Gebenstorf (CH);
Daniel Chartouni, Baden (CH);
Jean-Claude Mauroux, Hunzenschwil (CH); Leopold Ritzer, Untersiggenthal (CH); Peter Unternaehrer, Wurenlos (CH); Thomas Schoenemann, Schafisheim (CH); Marc Mollenkopf, Birsfelden (CH); Lukas Zehnder, Baden-Dattwil (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 11/798,482

(22) Filed: May 14, 2007

(65) Prior Publication Data

US 2007/0209790 A1    Sep. 13, 2007

Related U.S. Application Data

(63) Continuation of application No. PCT/CH2005/000629, filed on Oct. 27, 2005.

(30) Foreign Application Priority Data

Nov. 16, 2004   (EP)   ................................. 04405704

(51) Int. Cl.
*H01B 9/06*   (2006.01)

(52) U.S. Cl. ................................... 174/15.1

(58) Field of Classification Search ............... 174/15.1, 174/15.2
See application file for complete search history.

(56) References Cited

U.S. PATENT DOCUMENTS

| | | | | |
|---|---|---|---|---|
| 3,662,137 A | * | 5/1972 | Cleaveland | .................. 200/289 |
| 3,767,835 A | * | 10/1973 | Engelhardt | ............. 174/11 BH |
| 3,769,551 A | * | 10/1973 | Corman et al. | .............. 361/676 |
| 3,778,680 A | * | 12/1973 | Vaneerden | ................... 361/689 |
| 4,005,297 A | * | 1/1977 | Cleaveland | .................. 218/118 |

FOREIGN PATENT DOCUMENTS

| | | |
|---|---|---|
| DE | 2 051 150 | 4/1972 |
| DE | 2 238 987 | 2/1974 |
| EP | 0 242 669 | 10/1987 |

OTHER PUBLICATIONS

International Search Report for PCT/CH2005/000629 dated Jan. 19, 2006.
G.Yale Eastman, "The Heat Pipe", Scientific America, Bd. 218, Mar. 31, 1968, Seiten 38-46, XP008058156 USASeite 46, Spalte 1.

* cited by examiner

*Primary Examiner*—William H Mayo, III
(74) *Attorney, Agent, or Firm*—Buchanan Ingersoll & Rooney PC

(57) ABSTRACT

An exemplary isolating tube, and production method thereof, includes a mechanically load-bearing plastic tube composed of a fiber-reinforced polymer for use in a cooling element which can be loaded with high voltage, during whose operation the isolating tube forms an electrical isolation gap and in the tube interior carries an agent which flows as a liquid and/or vapor. The isolating tube can have a diffusion barrier which is held coaxially by the plastic tube. Such an isolating tube can be produced using an exemplary novel method for production.

20 Claims, 1 Drawing Sheet

ISOLATING TUBE FOR A COOLING ELEMENT WHICH CAN BE LOADED WITH HIGH VOLTAGE

RELATED APPLICATIONS

This application claims priority under 35 U.S.C. §119 to EP Application 04405704.0 filed in Europe on Nov. 16, 2004, and as a continuation application under 35 U.S.C. §120 to PCT/CH2005/000629 filed as an International Application on Oct. 27, 2005, designating the U.S., the entire contents of which are hereby incorporated by reference in their entireties.

TECHNICAL FIELD

The disclosure relates to a isolating tube for a cooling element which can be loaded with high voltage, to a cooling element which contains this isolating tube, and to methods for production of the isolating tube.

BACKGROUND INFORMATION

In this case, in principle, the expression high voltage should be understood as meaning an operating voltage of more than 1 kV. The preferred voltage range is below 100 kV and mainly relates to apparatuses and installations which carry heavy current and have rated voltages of typically 10 to 50 kV.

The current-carrying capability of apparatuses and installations such as these is limited thermally. Passive cooling elements, such as cooling ribs, are used for the lower rated-current range. However, the options for increasing the rated-current range with the use of known passive cooling elements are very restricted. Active cooling elements (for example air-air heat exchangers with fans) are therefore used for heavier rated currents, such as those which are carried in heavy-current appliances in the form of generator switches.

In addition to active cooling elements such as these, high-power, passive cooling elements have also already been proposed for use in heavy-current switchgear. High-power passive cooling elements such as these include heat pipes. In the case of heat pipes, the heat which is created by current-flow losses in the switch is used to vaporize an agent. The vaporized agent is transported to an external heat exchanger, where it emits the heat losses formed in the switch again by condensation.

Generator switches are generally encapsulated on a single-phase basis and have an inner conductor which is arranged in the encapsulation and is at high-voltage potential. Heat which is formed by current-flow losses on the inner conductor must be dissipated to the surrounding air through the grounded encapsulation. This means that an electrically isolating path must be located between a vaporizer, which is at high-voltage potential, and a condenser, which is kept at ground potential, for the heat pipe, and must be designed appropriately for the required high voltage (for example 150 kV BIL). The vaporizer and condenser are held in a vacuum-tight manner at the two ends of the hollow isolating body.

Since a high-power passive cooling element such as this has no moving parts such as fans, this cooling element can be used to remove heat losses from the encapsulation at low cost and efficiently. In this case, the hollow isolating body carries out a number of functions, in particular that of carrying the agent and that of isolation of the potentials of the vaporizer and condenser. The reliability of a high-power passive cooling element such as this and of a high-voltage installation equipped with a cooling element such as this is ensured only if the isolating tube carries out the abovementioned functions over many years.

DE 22 38 987 A1 describes an isolating tube of the abovementioned type. This isolating tube forms a heat pipe, together with a metal cylinder which is fitted to one of its ends and with a cooling and closure element which is fitted to the opposite end. Heat losses which are produced by the operating current in a switch with little liquid are dissipated from the switch by this heat pipe. The heat losses are in this case absorbed by the heat pipe by vaporization of a liquid, for example of a fluorocarbon, in the metal cylinder which is attached to those parts of the switch which form the heat losses, and is emitted to the surrounding area by condensation of the liquid vapor on the cooling and closure element. The isolating tube may be composed of a glass-fiber-reinforced epoxy resin or the like and is arranged in the interior of a pole tube, which is filled with quenching liquid and is closed by the cooling and closure element. The individual parts of the heat pipe are connected to one another in a vacuum-tight manner by means of suitable seals or by adhesive bonding. A capillary structure which lines the inner wall of the isolating tube allows the heat pipe to be installed horizontally.

A metal-encapsulated switchgear assembly having heat pipes is described in U.S. Pat. No. 3,662,137 A and in U.S. Pat. No. 4,005,297 A. Each heat pipe may be composed of insulating material. The heat pipe then has a container, which is formed from ceramic, for holding an agent, for example a fluorided hydrocarbon, as well as a capillary structure, which is arranged in the container and is composed of glass fibers.

A heat pipe for use in electrical high-voltage circuits is described in G. Yale Eastman: "The Heat Pipe" Scientific American, Volume 218 (May 31, 1968), pages 38 to 46, in particular on page 42. This heat pipe is produced exclusively from insulating material and contains a glass container, in which a capillary structure composed of glass fibers and fluorided hydrocarbon as an agent for the heat pipe are arranged.

EP 242 669 A discloses a heat-absorbing component of a capillary-pumped cooling circuit, in which the capillary material is porous plastic, such as polytetrafluoroethylene, polyethylene or polystyrene.

A cooling element having a hollow isolating body is already known from DE 2 051 150 A. The hollow isolating body is in the form of a hollow post insulator and keeps a switch-pole conductor track which is at high-voltage potential at a distance from the wall of a pole housing which is filled with a switching liquid. A cooler is held on the wall and is connected via two flow lines, which are arranged in the post insulator, to an annular space surrounding the current path. A vaporization means is located in the cooler, in the flow lines and in the annular space. Current which is carried in the current path heats that part of the vaporization agent that is located in the annular space, via the switching liquid. Vapor that is formed in the process is passed via one of the two flow lines into the cooler, in which it condenses, emitting the heat that was absorbed during vaporization. The resultant condensation falls down in the cooler and forces liquid vaporization agent located in the cooler back again into the annular space through the other flow line, in which annular space a new vaporization-condensation cycle is initiated for the liquid vaporization agent that has been supplied.

SUMMARY

An isolating tube is disclosed, which can be manufactured easily and can easily be fitted in a cooling element, which is still distinguished by high operational reliability even after many years of operation in severe electrical, thermal and chemical load conditions. Methods are disclosed for production of an isolating tube.

An exemplary isolating tube has a mechanically load-bearing plastic tube composed of a fiber-reinforced plastic, as well as a diffusion barrier which is held coaxially by the plastic tube. A design such as this ensures that the isolating tube reliably satisfies the requirement for a cooling element in a high-voltage installation. This is because the plastic tube can absorb the mechanical and thermal loads that occur during fitting and operation of the cooling element, so that materials, in particular such as glass or ceramic, can be chosen for the diffusion barrier which, although they are comparatively brittle, particularly effectively constrain diffusion processes, however. Since the diffusion barrier is mechanically lightly loaded owing to the load reduction provided by the plastic tube, even any cracks which may occur in the diffusion barrier do not adversely affect the diffusion-constraining effect of this barrier. This is because cracks such as these are not loaded with significant forces and cannot become sufficiently larger during operation of the cooling element. Adequate diffusion constraint is therefore always ensured. Furthermore, metal fittings can be fitted to the ends of the plastic tube in a manner which is particularly advantageous in terms of production engineering, in particular by adhesive bonding, and are used for the attachment of major parts of the cooling element, such as the vaporizer, the condenser and bellows for expansion compensation and for absorption of mechanical forces which are introduced into the cooling element, for example, by vibration oscillations. Furthermore, the fibers that are provided in the plastic tube prevent fragmentation of the isolating tube and thus increase the operational reliability of the cooling element equipped with this tube, as well as that of a high-voltage installation in which this cooling element is installed.

Since, even at high temperatures, glass and ceramic are resistant to the agent that is used in the cooling element and may be chemically aggressive, a glass or ceramic tube is advantageously provided as the diffusion barrier, and is arranged on the inside of the plastic tube. Because the ductility of glass and ceramic is low, it is recommended that a reversibly deformable damping layer be arranged between the plastic tube and the glass or ceramic tube in order in this way to protect the diffusion barrier against the influence of mechanical forces. It is also advantageous to cover the inner surface of the glass or ceramic tube with fragmentation protection in the form of a film. This prevents fragments from becoming detached and falling off in the event of mechanical damage to the diffusion barrier. Cracks formed in the event of damage can therefore not propagate, so that the diffusion-constraining effect of the diffusion barrier is essentially maintained.

One proven exemplary method for production of the isolating tube is characterized in that fiber material which has been pre-impregnated with polymer or has not been impregnated is wound on a casing surface of a diffusion barrier, which is in the form of a tube, forming a preformed body, in that the preformed body formed in this way is arranged in a mold and is soaked with polymer in the situation in which the preformed body does not contain impregnated fiber material, and in that the polymer which is introduced by pre-impregnation or soaking is cured in the mold at a raised temperature.

If the diffusion barrier is not in the form of a prefabricated tube, then, in another exemplary production method, fiber material which has been pre-impregnated with polymer or has not been impregnated is wound onto a casing surface of a removable winding core, during the winding process, sections of the diffusion barrier which are in the form of films are inserted into the fiber material, a preformed body which is formed in this way is arranged in a mold and is soaked with polymer in the situation in which the preformed body does not contain impregnated fiber material, and subsequently the polymer which is introduced by pre-impregnation or soaking is cured in the mold at a raised temperature.

There is no need for the mold for production of the isolating tube if the plastic tube and a diffusion barrier which is in the form of a tube are prefabricated, the external diameter of the diffusion barrier and the internal diameter of the plastic tube are matched to one another, and the two tubes are adhesively bonded to one another after insertion of the diffusion barrier into the plastic tube.

Further features and their advantageous effects on the invention will become evident from the exemplary embodiment described in the following text.

BRIEF DESCRIPTION OF THE FIGURES

This exemplary embodiment of the invention will be explained in more detail with reference to drawings, in which.

DETAILED DESCRIPTION

Figure 1:
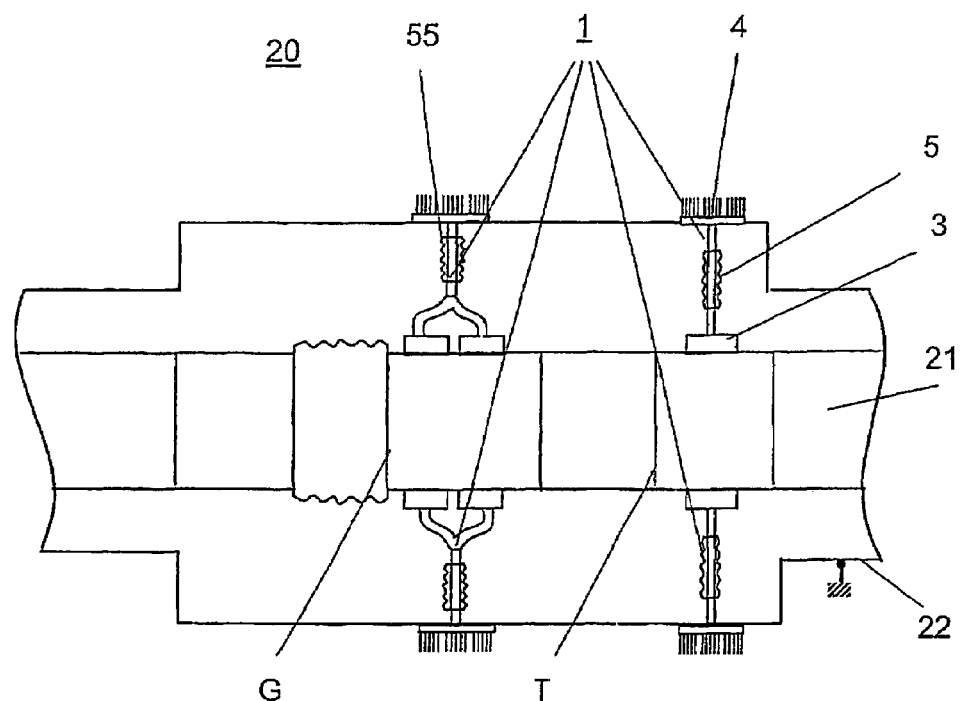
FIG. 1 shows a plan view of a section of a cooling element with a high-voltage installation which in each case contains an exemplary isolating tube and is encapsulated, with a part of the encapsulation pointing upwards having been removed.

The same reference symbols denote parts having the same effect in all of the figures. The section of a high-voltage installation 20 illustrated in FIG. 1 is part of one phase of a polyphase generator output line and contains grounded metal encapsulation 22, an electrical conductor 21 which is held in the encapsulation, as well as cooling elements 1. The encapsulation 22 is used to carry a return current, which occurs during operation of the installation, while in contrast the electrical conductor 21 is used to carry a current produced in the generator, typically of 10 to 50 kA for voltages of typically 10 to 50 kV. As can be seen, the electrical conductor 21, or the sections which are in the form of a generator switch G or an isolating switch T, of it make thermally conductive contact with in each case two of the cooling elements 1.

The cooling elements 1 each have a closed vacuum-tight volume in which an agent is arranged which can in general be circulated under the influence of the force of gravity or else by capillary forces. A cooling element 1 which operates with the aid of the force of gravity is therefore arranged at an angle to the horizontal. A vaporizer 3 is then located at the lower end of the cooling element 1, and a condenser 4 is located at the upper end. The vaporizer 3 is made from metal and is thermally coupled to the electrical conductor 21. The condenser 4 is also made of metal. This condenser is mounted on the encapsulation 22, but can also be mounted alongside the encapsulation 22. In principle, the condenser 4 may be a separate object, which is fitted outside the encapsulation 22 and emits heat to the exterior. It can also be thermally coupled to the encapsulation 22. In general, it has cooling ribs which extract the heating effect of the electrical conductor 21. As can be seen from FIG. 1, in order to achieve better vaporizer performance, the cooling element 1 can also have two vaporizers (or possibly even more than two). Capillaries extending from the vaporizer to the condenser 4 can also be arranged in the interior of the cooling element 1. The agent which is liquefied in the condenser 4 is then supplied from the condenser 4 to the vaporizer 3 by capillary forces. A cooling element provided with capillaries can be installed in the installation 20 independently of its position, that is to say aligned upwards, downwards, horizontally or obliquely upwards or downwards. In an exemplary embodiment, an isolating tube 5, which acts as an isolation gap, is provided in order to bridge the potential difference between the vaporizer 3 or electrical conductor 21 and condenser 4 or encapsulation 22. This exemplary isolating tube may have a shield 55 which lengthens the creepage distance, as illustrated in FIG. 1. The isolating tube 5 is not only subject to high electrical loads during operation of the installation 20 but is at the same time also subject to thermal and chemical loads which are caused by the agent circulating as a liquid and/or as a vapor in its body interior.

A collecting container, which is not illustrated, can be provided in the area of the condenser 4, and its volume is variable in the event of pressure changes in the interior of the cooling element 1. Furthermore, an auxiliary gas, such as air at a partial pressure of a few hundred millibars, can also be provided in the interior of the cooling element, as well as the agent medium, ensuring that the cooling element 1 has high dielectric strength even when the agent partial pressure is low, as it may be at low temperatures.

During operation, the rated current which is carried in the electrical conductor 21 and is produced in the generator heats the installation to a considerable extent. Since parts of the installation which are at particular risk, for example insulators to which the electrical conductor is fitted, must not exceed a typical temperature limit of 105° C., only a specific rated current can be carried which, for example, may be 13 kA without cooling. The agent is vaporized in the vaporizer 3, and heat is extracted from the electrical conductor 21 in the process. If a suitable agent is used, such as acetone or a hydro-fluoro-ether, the electrical conductor 21 can be kept below the temperature limit despite the rated current having been increased considerably in comparison to an uncooled installation. The vaporized agent is liquefied with condensation heat being emitted in the condenser 4, and flows back again into the vaporizer 3 via the angled cooling element 1, by virtue of the force of gravity. If the cooling element has capillaries, then the liquefied agent reaches the vaporizer as a result of the capillary forces, possibly against the force of gravity. In order to additionally achieve rapid liquefaction, the condenser 4 should typically be heated at most to about 70° C. The suitably designed and suitably distributed cooling elements in the installation thus make it possible to increase the rated current to, for example, 22 kA without exceeding the predetermined temperature limit. However, since this is possible only with correctly operating cooling elements 1, it is important for safe and reliable operation of the installation that the cooling elements and in particular their isolating tube 5 are distinguished by having a long life and high operational reliability.

Figure 2:
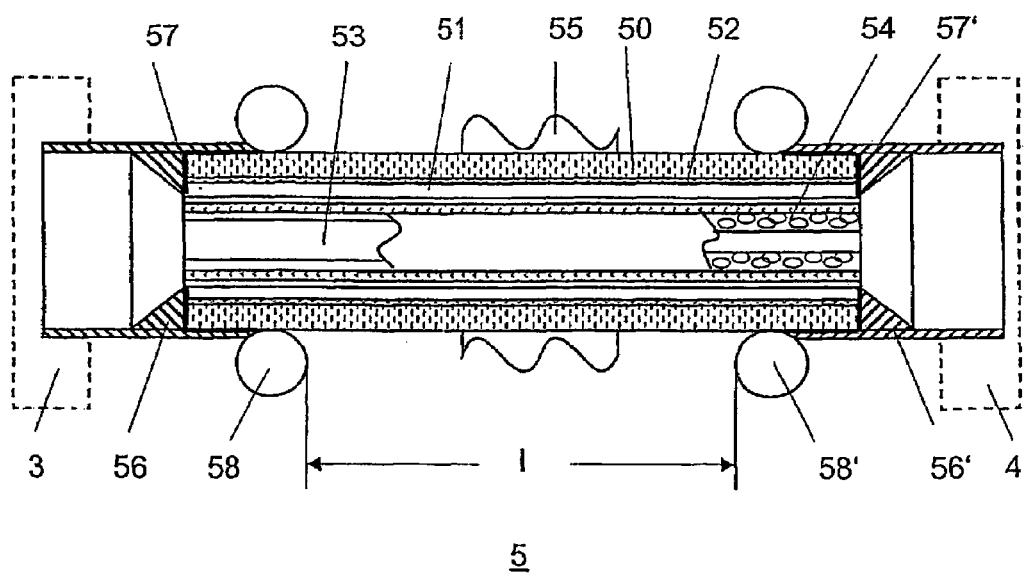
FIG. 2 shows an enlarged illustration of an exemplary isolating tube, provided in one of the cooling elements of the installation shown in FIG. 1.

FIG. 2 shows the configuration of an exemplary isolating tube 5 such as this. As can be seen, the tube 5 has a mechanically load-bearing plastic tube 50 composed of a fiber-reinforced polymer, as well as a diffusion barrier 51 which is held coaxially by the plastic tube. The plastic tube 50 has an internal diameter of several centimeters, for example 5 centimeters, and a length of a few decimeters, for example 2 or 3 decimeters, and contains a fiber body which is produced, for example, by winding of threads or fabrics composed of glass, ceramic and/or plastic fiber, in particular based on aramide, polyamide or polyester, with this fiber body being embedded in a cured thermoset material, such as an epoxy or a polyester. Typical plastic-tube wall thicknesses are 3 to 10 mm.

In the exemplary embodiment of the isolating tube 5 illustrated in FIG. 2, the diffusion barrier 51 is in the form of a glass or ceramic tube with a wall thickness of typically 1 to 3 mm. For manufacturing reasons, this tube is manufactured from a glass, for example a borosilicate glass or quartz glass, which is inert when subjected to aggressive substances even at temperatures above 100° C., and is arranged on the inside of the plastic tube 50. Substances which are provided in the interior of the cooling element 1, such as the agent and the auxiliary gas which may be provided, can therefore not diffuse into the plastic tube 50, or flow through it. Conversely, substances which surround the cooling element 1, such as air or water, can enter the interior of the cooling element 1.

A reversibly deformable damping layer 52 is arranged between the plastic tube 50 and the diffusion barrier 51, which is in the form of a glass or ceramic tube. Since, depending on where the high-voltage installation 20 is used, the cooling element 1 may be subject to temperatures of between −40° C. and 105° C., an elastomer polymer, for example based on silicone, is in general provided as the damping layer 52. At the same time, the damping layer also produces an adhesively bonded joint between the plastic tube 50 and the diffusion barrier 51. A wall thickness of at least about 1 mm, together with the damping layer 52, in general provides adequate protection for the diffusion barrier 51 against undesirably high stress loads.

The inner surface of the diffusion barrier 51, which is in the form of a glass or ceramic tube, is covered with fragmentation protection 53, which is advantageously formed by a film, for example based on PTFE. Fragmentation protection such as this prevents fragments from falling off if the diffusion barrier 51, which is in general composed of brittle material, such as glass or ceramic, has been damaged by incorrect handling or during operation of the cooling element and has cracks and/or discontinuities which, although they decrease its mechanical strength, do not significantly adversely affect its diffusion characteristics. The fragmentation protection 53 can be adhesively bonded or applied directly to the inner surface of the glass or ceramic tube. If it is in the form of a flexible film, it can be wound as a single-layer or double-layer tube with little prestressing, and can be fixed on the inner surface of this tube with the aid of the prestressing force, after being inserted into the glass and ceramic tube.

The diffusion barrier may also be in the form of a flexible film based on glass and/or ceramic, and may be embedded in the fiber body during the production of the plastic tube 50. For good mechanical strength, it may be advantageous for the film to contain a support based on polymer, on which flexible glass or flexible ceramic is held as a diffusion-constraining material.

If required, a capillary structure 54 as indicated in FIG. 2 can also be applied to the inside of the diffusion barrier, thus also allowing the cooling element 1 to operate against the force of gravity.

The shield 55 can be formed in the casing surface of the plastic tube 50 or can be applied to this casing surface, for example by extrusion coating or by shrinking it on. The shield lengthens the creepage distance on the outside of the isolating tube 5, and considerably reduces the risk of surface flashovers.

One of two metal fittings 56, 56' is held in a vacuum-tight manner at each of the two ends of the plastic tube 2. As can be seen, the metal fitting 56 or 56', respectively, is adhesively bonded to the plastic tube with the aid of a respective connection layer 57 or 57', which is applied to one of the two end faces of the plastic tube 50. A connection layer such as this is in general composed of a cured polymer, for example based on epoxy, and in addition to the connection function also ensures protection of the end surface of the plastic tube 50, which is in general subsequently machined and therefore has unprotected fibers. In order to increase the strength of the adhesively bonded joint, the connection layer 57 or 57' is continued to a section of the casing surface of the plastic tube 50 adjacent to the end face. As can be seen, the two metal fittings 56 and 56' are fitted at each of the mutually facing ends with a shielded electrode 58 or 58', respectively, which is passed in an annular shape around the plastic tube 50. Any sharp edges that there may be at the ends of the plastic tube 50 and of the diffusion barrier 51 are therefore electrically shielded. At the same time, this defines an isolation gap, annotated with the reference symbol I in FIG. 2. As is indicated by dashed lines in FIG. 2, during manufacture of the cooling element 1, the vaporizer 3 can then be flange connected in a vacuum-tight manner to the metal fitting 56—possibly with the interposition of a bellows—and the capacitor 4 can be flange-connected in a vacuum-tight manner to the metal fitting 56'—possibly likewise with the interposition of a bellows.

If the diffusion barrier 51 is in the form of a tube, then fiber material which has been pre-impregnated with polymer or has not been impregnated is first of all wound onto the casing surface of the diffusion barrier during the production of the isolating tube 5. A preformed body formed in this way is then inserted into a mold. If impregnated fiber material is not used, the preformed body is soaked with polymer. The preformed body containing the soaked or pre-impregnated fiber material is then cured in the mold, at a raised temperature.

In another exemplary manufacturing method, fiber material which has pre-impregnated with polymer or has not been impregnated is wound onto the casing surface of a removable winding core. Sections of the diffusion barrier in the form of films are inserted into the fiber material during the winding process. The preformed body formed in this way is arranged in a mold, as already described, and, in the case of a performed body which does not contain impregnated fiber material, is soaked with the polymer. The polymer introduced by pre-impregnation or soaking is cured in the mold at a raised temperature.

In both exemplary methods, the metal fittings 56 and 56' can be fixed to the plastic tube 50 while the polymer is curing, forming the connection layers 57 and 57'.

The isolating tube 5 can also be produced from a prefabricated plastic tube 50 and a prefabricated diffusion barrier 51 in the form of a tube. In this production process, the external diameter of the diffusion barrier 51 and the internal diameter of the plastic tube 50 are matched to one another, for example by machining. Once the diffusion barrier has been inserted into the plastic tube, the two tubes are adhesively bonded to one another. In this exemplary method, the fragmentation protection 53 can be applied to the inside of the diffusion barrier 51 while it is actually being produced. This also applies to the shield 55, which can be formed into the prefabricated plastic tube 50 in advance, or can be applied to its casing surface by extrusion-coating with a polymer, for example a silicone, or by shrinkage of a polymer hollow body onto it. The metal fittings 56 and 56' can be fixed to the plastic tube 50 by adhesive bonding.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Cooling element
3 Vaporizer
4 Condenser
5 Isolating tube
20 High-voltage installation
21 Electrical conductor
22 Metal encapsulation
50 Plastic tube
51 Diffusion barrier
52 Damping layer
53 Fragmentation protection
54 Capillary structure
55 Shield
56, 56' Metal fittings
57, 57° Connection layers
58, 58' Shielding electrodes
G Generator switch
T Isolating switch

What is claimed is:

1. An isolating tube having a mechanically load-bearing plastic tube composed of a fiber-reinforced polymer for use in a cooling element which can be loaded with high voltage, during whose operation the isolating tube forms an electrical isolation gap and in the tube interior carries an agent which flows as a liquid and/or vapor, wherein the isolating tube has a diffusion barrier which is held coaxially by the plastic tube.

2. The isolating tube as claimed in claim 1, wherein the diffusion barrier is in the form of a glass or ceramic tube.

3. The isolating tube as claimed in claim 2, wherein the glass or ceramic tube is arranged on the inside of the plastic tube.

4. The isolating tube as claimed in claim 3, wherein a reversibly deformable damping layer is arranged between the plastic tube and the glass or ceramic tube.

5. The isolating tube as claimed in claim 2, wherein the inner surface of the glass or ceramic tube is covered with fragmentation protection in the form of a film.

6. The isolating tube as claimed in claim 1, wherein the diffusion barrier is in the form of a flexible film based on glass and/or ceramic.

7. The isolating tube as claimed in claim 6, wherein the film contains a support based on a polymer.

8. The isolating tube as claimed in claim 1, wherein a capillary structure is applied to an inner surface of the diffusion barrier.

9. The isolating tube as claimed in claim 1, wherein the plastic tube is fitted with a shield.

10. The isolating tube as claimed in claim 1, wherein one of two metal fittings is held in a vacuum-tight manner at each of the two ends of the plastic tube.

11. The isolating tube as claimed in claim 10, wherein at least one of the two metal fittings is adhesively bonded to the plastic tube with the aid of a connection layer which is applied to one end face of the plastic tube.

12. The isolating tube as claimed in claim 11, wherein the connection layer is guided on a section of the casing surface of the plastic tube.

13. The isolating tube as claimed in claim 10, wherein the two metal fittings are fitted with a shielding electrode, which is passed in an annular shape around the plastic tube, at each of the mutually facing ends.

14. An isolating tube as claimed in claim 10, in combination with a cooling element, wherein the first of the two metal fittings is connected to a vaporizer, which can be heated by an electrical conductor of a high-voltage installation, and the second is connected to a condenser, which is arranged on grounded encapsulation of the installation.

15. The isolating tube as claimed in claim 1, wherein fiber material which has been pre-impregnated with polymer or has not been impregnated is wound on a casing surface of a diffusion barrier, which is in the form of a tube, forming a preformed body, the preformed body formed in this way having been arranged in a mold and soaked with polymer in the situation in which the preformed body does not contain impregnated fiber material, and the polymer which is introduced by pre-impregnation or soaking having been cured in the mold at a raised temperature.

16. The isolating tube as claimed in claim 1, wherein fiber material which has been pre-impregnated with polymer or has not been impregnated is wound onto a casing surface of a removable winding core, wherein, during the winding process, sections of the diffusion barrier which are in the form of films are inserted into the fiber material, a preformed body which is formed in this way having been arranged in a mold and soaked with the polymer in the situation in which the preformed body does not contain impregnated fiber material, and the polymer which is introduced by pre-impregnation or soaking having been cured in the mold at a raised temperature.

17. The isolating tube as claimed in claim 1, wherein the plastic tube and a diffusion barrier which is in the form of a tube are prefabricated, wherein the external diameter of the diffusion barrier and the internal diameter of the plastic tube are matched to one another, and wherein, after the diffusion barrier has been inserted into the plastic tube, the two tubes are adhesively bonded to one another.

18. The isolating tube as claimed in claim 15, wherein fragmentation protection is applied to the inside of the tube if the diffusion barrier is in the form of a glass or ceramic tube.

19. The isolating tube as claimed in claim 15, wherein a shield is formed in the casing surface of the plastic tube, or a shield is applied to the casing surface of the plastic tube.

20. The isolating tube as claimed in claim 15, wherein, during the curing of the polymer or after manufacture of the plastic tube, two end sections of the isolating tube, which are each in the form of metal fittings, are fixed to the plastic tube.

* * * * *